United States Patent [19]

Rapkin et al.

[11] Patent Number: 5,559,324
[45] Date of Patent: Sep. 24, 1996

[54] CONTINUOUS SAMPLE DETECTOR WITH STANDARD

[75] Inventors: Edward Rapkin, Short Hills, N.J.; Gavin Steele, Tampa, Fla.

[73] Assignee: IN/US Systems, Inc., Fairfield, N.J.

[21] Appl. No.: 409,003

[22] Filed: Mar. 23, 1995

[51] Int. Cl.⁶ .................................................. G01T 1/204
[52] U.S. Cl. ........................................ 250/252.1; 250/364
[58] Field of Search .................................. 250/336.1, 364, 250/432 R, 435, 252.1 R, 252.1 A

[56] References Cited

U.S. PATENT DOCUMENTS

| | | | |
|---|---|---|---|
| 3,560,744 | 2/1971 | Jordan | 250/252.1 X |
| 3,724,956 | 4/1973 | Neary | 250/364 X |
| 4,092,539 | 5/1978 | Pao et al. | 250/252.1 X |
| 4,841,151 | 6/1989 | Shope | 250/364 |

FOREIGN PATENT DOCUMENTS

| | | | |
|---|---|---|---|
| 55-156881 | 12/1980 | Japan | 250/252.1 |
| 56-8582 | 1/1981 | Japan | 250/252.1 |
| 56-92484 | 7/1981 | Japan | 250/252.1 |
| 61-53584 | 3/1986 | Japan | 250/252.1 |

Primary Examiner—Carolyn E. Fields
Assistant Examiner—Edward J. Glick
Attorney, Agent, or Firm—Thomas L. Adams, Esq.

[57] ABSTRACT

A continuous sample detector includes a sample chamber, a cell body and one or more standard sources of radiation. Mounted in the sample chamber, the cell body has a cell, a coil of transparent tubing through which the sample solution continuously passes during the measurement. The standard source of radiation is mounted adjacent to the cell body. The detector also includes a sensor mounted and arranged proximate the cell and the standard source to encounter relative reciprocation for allowing the sensor to alternately sense radiation of the cell and the standard source. The detector is operated by connecting sample lines to the cell body. The sensor and cell are then positioned to detect radiation from the cell with the sensor, while a sample flow is pumped through the cell. The system is calibrated by disposing the sensor and the standard source to detect radiation from the standard source with the sensor, without disconnecting the sample lines from the cell body. The sensor and the cell are repositioned to detect radiation from the cell with the sensor.

39 Claims, 4 Drawing Sheets

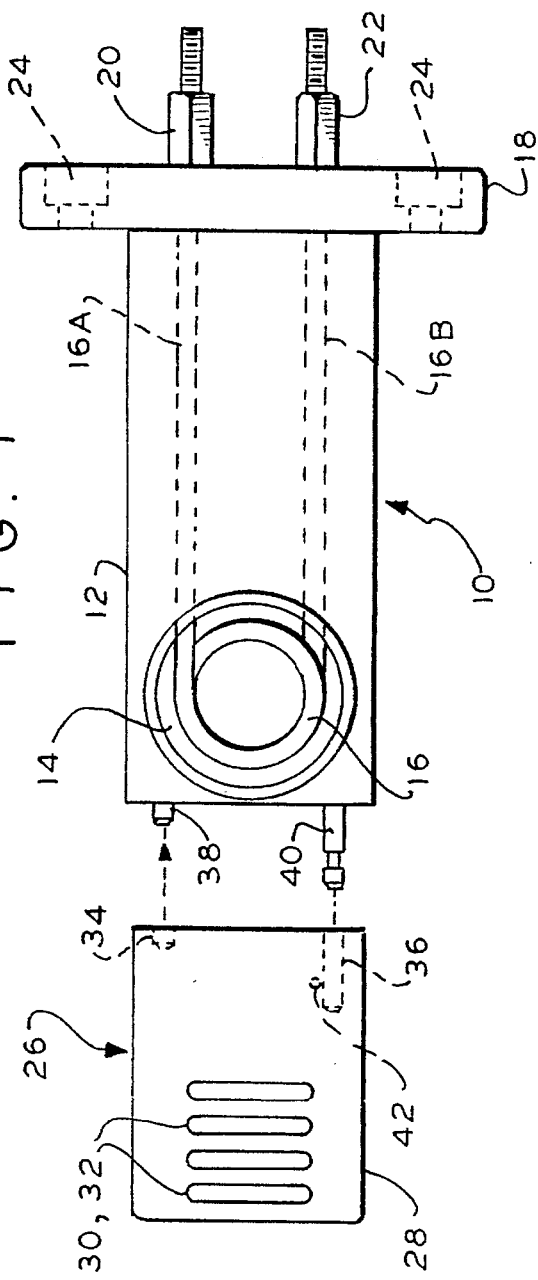
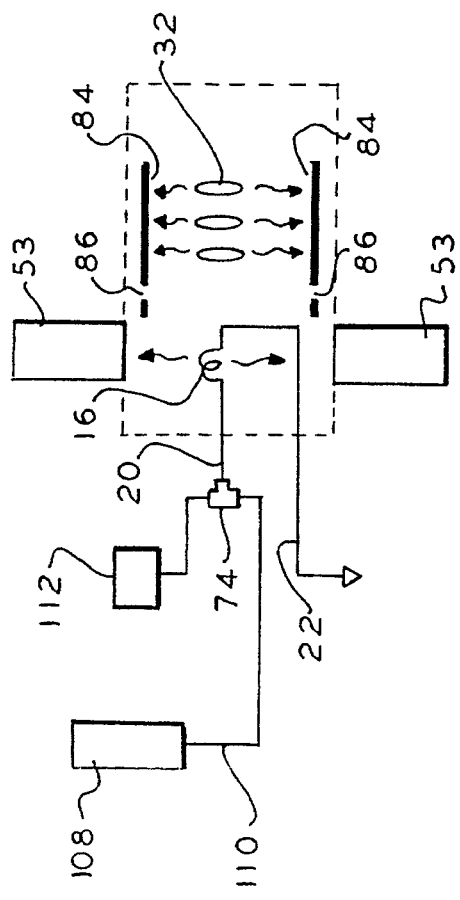

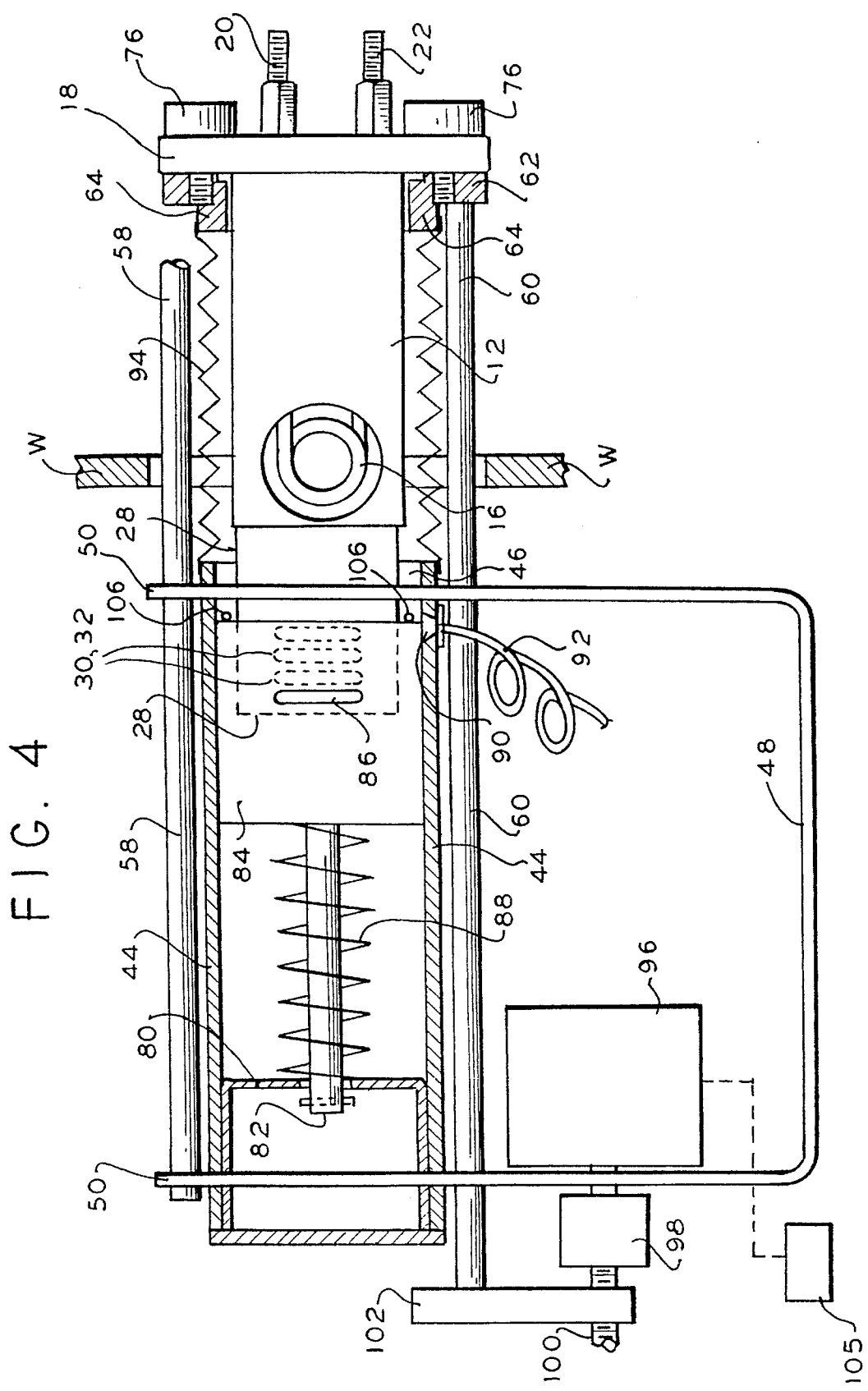

CONTINUOUS SAMPLE DETECTOR WITH STANDARD

BACKGROUND OF THE INVENTION

1. Field of the Invention

The present invention relates to continuous sample detection, and in particular, to the use of standards for determining the performance, stability, or reproducibility of the measuring instrument.

2. Discussion of Related Art

The effects of a radioactive tracer introduced into an organism may in part be determined by removing tissue samples for analysis. A known method of detecting these radioactive tracers is to pass extracts, digests, and other solutions derived therefrom through a chromatographic column to separate their constituents into various fractions, in the usual fashion. The eluate from the chromatographic column can then be passed through a device for detecting the radioactivity.

Radioactivity detection is often practiced with a flow-through detector that continuously monitors the radiation from sample flowing through a cell. When the continuous flow to the cell is the eluate from a high performance liquid chromatography column (HPLC) large amounts of information can be obtained through numerical and graphical analysis.

In a known detection technique, the eluate is continuously mixed with a scintillating solution and passed through a transparent tubular cell mounted in a sample block inside a light-tight box. Alternatively, scintillation solution need not be used and instead the eluate is passed over insoluble scintillator particles within the cell. The faint light coming from the tubular cell is detected by a pair of photomultiplier tubes on opposite sides of the cell. See for example, U.S. Pat. No. 4,194,117.

External standardization has been used in liquid scintillation systems to determine the quality of individual samples, especially for quenching phenomena. With that technique, an external radioactive source is brought near the sample to determine how the scintillation process varies in response to known radioactive stimulation. See for example, U.S. Pat. Nos. 3,609,361; 3,188,468; and 3,381,130. For other quenching correction techniques see U.S. Pat. Nos. 4,008,393 and 4,292,520. See also U.S. Pat. Nos. 3,935,449 and 4,967,048.

Calibrating the accuracy of a continuous flow radiochromatography system has problems that are absent from a discontinuous system. Discontinuous systems can work from a plurality of samples and vials that are conveyed to a liquid scintillation detector for discrete measurements. With such a system, sealed standards can be interspersed with the sample vials so that calibration measurements can be made periodically. Systems for measuring the scintillation of discrete vials are shown in U.S. Pat. Nos. 4,634,869; 4,833,326; and 5,146,093.

Known methods for checking performance of a continuous-flow radioactivity monitor involve repetitive measurement of known standard samples followed by statistical data treatment of the measured results. The known methods have disadvantages.

Sealed Standards

The normal counting cell may be removed and replaced with a sealed standard, which is counted under the same conditions, time after time. This sealed standard can be a simple glass tube filled with a mixture of radioactive material and scintillating solution.

By observing the trend of such countings and applying well-known mathematics to the results, the reproducibility of the instrument can be assessed. If the activity level of the standard is known, the counting efficiency of the instrument for the particular conditions employed can be determined.

If several standards of different known activity levels are sequentially counted, it is possible to establish whether or not the system is linear with respect to activity. If several standards, each of a different isotope, are counted, usually with different counting windows (different energy ranges) it is possible to determine the quality of dual-isotope separation and whether or not that changes with time.

Changing from the flow-cell to a sealed standard is difficult. In most instruments, the cover must be removed, the high voltage disabled, plumbing fittings disconnected, the cell removed (potentially causing problems with ambient light as explained below), the standard holder installed, the cover replaced, and the high voltage reestablished. Finally the measurement can be made. Then all of the forgoing steps must be reversed to reestablish normal flow cell operation.

If more than one sealed standard is examined, after each measurement the high voltage must be turned off, the standard holder exchanged, the high voltage turned on again, and then the new standard measured. After the second standard, the steps are repeated and so on, for each standard.

The high voltage must be turned off each time a cell or the standard holder is removed or inserted. Exposure of a photomultiplier to ambient light with the high voltage applied can cause irreparable damage, since the consequential high current flows will likely "strip" the photocathodes.

Regardless, removing the high voltage is inherently problematical, because photomultipliers are most quiet (i.e., least electronic noise) when kept at constant high voltage for long periods. Similarly, even with the high voltage off, exposure to ambient light can cause photocathodes to become light activated, requiring then a lengthy period of dark adaptation to reduce background noise to minimum levels.

Similarly, removal and ambient illumination of cells packed with solid scintillators (particularly the popular yttrium silicate) cause light activation, again requiring a lengthy period of dark adaptation before the cell reaches its lowest backgrounds.

Repetitively disconnecting and reconnecting fittings is an invitation to leaks, especially at the high pressures that are apt to be encountered in HPLC. Cleanup of leakage of radioactive solutions may have heavy consequences.

Filling Cell with Standard Solution

Because replacing a cell with a standard is so unsatisfactory, some methods leave the normal counting cell in place. The cell can be directly filled with a standard solution introduced from a syringe mounted on a Luer fitting through a selector valve (which valve increases the potential for leaks and the generally disadvantageous, system dead volume).

The test starts with the pumping of wash solution through the system to clear residual activity before the cell is filled with a standard solution of radioactivity and scintillator via the syringe. A static test measurement is then made, and the cell is cleared of its standard activity by washing, before the system is returned to service.

This method is only suitable when the counting cell is empty and is being used with liquid scintillator or for Cerenkov counting. It is unsatisfactory for packed cells because fine particles with large total surface areas are normally employed. Back pressures are high, (typically 300–1500 psi.) and uniform filling of such a cell with a syringe cannot be done with confidence. Also, the physical force required, including the reciprocation of a syringe, and the inevitable air displacement, disrupts the packing, introducing voids, repositioning particles, channeling liquid flow, etc.

Occasionally, cells become contaminated. Reasonable washing does not succeed in removing all activity, leading to inaccurate test results. This problem is far more likely with packed cells than with liquid cells.

The overall consumption of standard increases cost, including the currently escalating disposal cost. Moreover, filling a cell via a syringe requires overages to fill the syringe, then to displace the previous wash, and also the fill the lines. Also, daily repetitive use of the same standard solution requires mixing a large amount of standard at one time. This idle supply of radioactivity (of questionable stability) effectively subtracts from the user's legal authority to possess radioactive substances. Linearity checking or the need for different isotopes will multiply the need and these problems.

Also, when a new batch of standard solution is made, its calibration can be affected by the purity of the solvent, varying scintillator purity, the concentration of the scintillator, and the radioactive standard.

Dynamic Measurements

In HPLC systems dynamic (transient) measurements are possible using sampling devices which allow automatic repetitive runs. Standards may be loaded among the samples being measured, but they again impact the costs, waste disposal problems, and other difficulties cited above.

As noted above, checking an instrument using a scintillator-packed cell requires a high pressure pump, which would more than likely be the pump used for chromatography; another pump would mean plumbing rearrangement. Thus to avoid replumbing, one must pass the standard solution through the HPLC column. The measurement will be dynamic and, for each peak, of relatively short duration with the standard peak passing through the cell as it might during a chromatography run.

Solid scintillators are often contaminated and the higher the level of activity, the more likely the contamination. Contaminants in effect provide false high readings, making the test rather pointless unless some form of compensation is effected. The logical compensation would be counting the background and subtracting it, but that is a major source of error unless lengthy counts are performed, which would keep the instrument out of service for excessive periods.

Automatic samplers have their own inherent errors of sample size and including them in a system broadens the potential for overall error. Also, dynamic measurement, unless at quite high activity levels, is not as accurate as a longer static measurement.

Since an HPLC run is usually involved, the accuracy of the measurement is subjected to the vagaries of the HPLC system; the entire process is tested, not just the instrument. For example, the HPLC column normally degrades with use and so too would the measurement.

Also, the total test time with the HPLC column would be excessively long, even though the measurement of the radioactive standard is likely to be inadequate in time. Moreover, to measure a dilution series for linearity requires multiple runs and unacceptable total times. Even if the HPLC column is bypassed in an attempt to accelerate the testing procedure, plumbing changes become necessary with all of the problems previously cited.

SUMMARY OF THE INVENTION

In accordance with the illustrative embodiments demonstrating features and advantages of the present invention, there is provided a continuous sample detector including a sample chamber, a cell body and a standard source of radiation. The cell body has a cell and is mounted in the sample chamber for conducting a continuous sample flow. The standard source of radiation is mounted adjacent to the cell body. The detector also includes a sensor mounted and arranged proximate the cell and the standard source to encounter relative reciprocation for allowing the sensor to alternately sense radiation of the cell and the standard source.

In accordance with another aspect of the invention, a method employs a standard source of radiation and a sensor for continuously detecting radiation from a sample flow delivered along sample lines to a cell in a cell body. The method includes the step of connecting the sample lines to the cell body. Another step is positioning the sensor and the cell to detect radiation with the sensor from the cell. Another step is pumping the sample flow through the cell. The method also includes the step of calibrating the instrument by disposing the sensor and the standard source to detect radiation with the sensor from the standard source, without disconnecting the sample lines from the cell body. Still another step is repositioning the sensor and the cell to detect radiation with the sensor from the cell.

Reference herein to "radiation" shall include such phenomena as light, radioactivity, electromagnetic radiation, particle emission, etc.

In a preferred apparatus or method employing the foregoing principles, sealed standards are attached to the inside end of a sample block. The combination can then slide as an assembly into various working positions. The motion is limited and therefore the lines to the sample cell need not be disconnected. Also, motion of the sample block can be performed in darkness in a light-tight sample chamber. Any gap between the light-tight chamber and the sample block can be shielded for example, by a preferred light-tight bellows.

A preferred standard holder mounted at the inside end of the sample block has several slots holding sealed standards of the type discussed above. The sample block and the standard holder can be shifted as a unit to bring any one of the sealed standards or the continuous sample cell in the sample block in alignment with stationary photomultiplier tubes.

When the standard holder is positioned between the photomultiplier tubes, a shutter intervenes so that only one of the sealed standards shines on the photomultiplier tubes at a time. When the sample block is thrust inwardly to the full extent, it pushes back the shutter so that the sample cell in the sample block can shine without restriction onto the photomultiplier tubes.

The preferred sample detector employs a preferred stepper motor and lead screw that can reciprocate a yoke plate that supports the cell body and standards holder. The motor can move the cell body out of alignment with the photomultiplier tubes and substitute the shutter and one of the sealed standards of the standards holder into alignment with the photomultiplier tubes, for calibration purposes.

BRIEF DESCRIPTION OF THE DRAWINGS

The above brief description as well as other objects, features and advantages of the present invention will be more fully appreciated by reference to the following detailed description of presently preferred but nonetheless illustrative embodiments, in accordance with the present invention, when taken in conjunction with the accompanying drawings, wherein:

FIG. 1 is an exploded, side elevational view of a cell body and standard holder, in accordance with the principles of the present invention;

FIG. 4 is a side elevational view of the apparatus of FIG. 3, but with the attachment plate extended by the illustrated drive mechanism; and FIG. 5 is a schematic view of the apparatus of FIGS. 3 and 4 shown hydraulically connected to a sampling system.

DETAILED DESCRIPTION OF PREFERRED EMBODIMENTS

Figure 2:
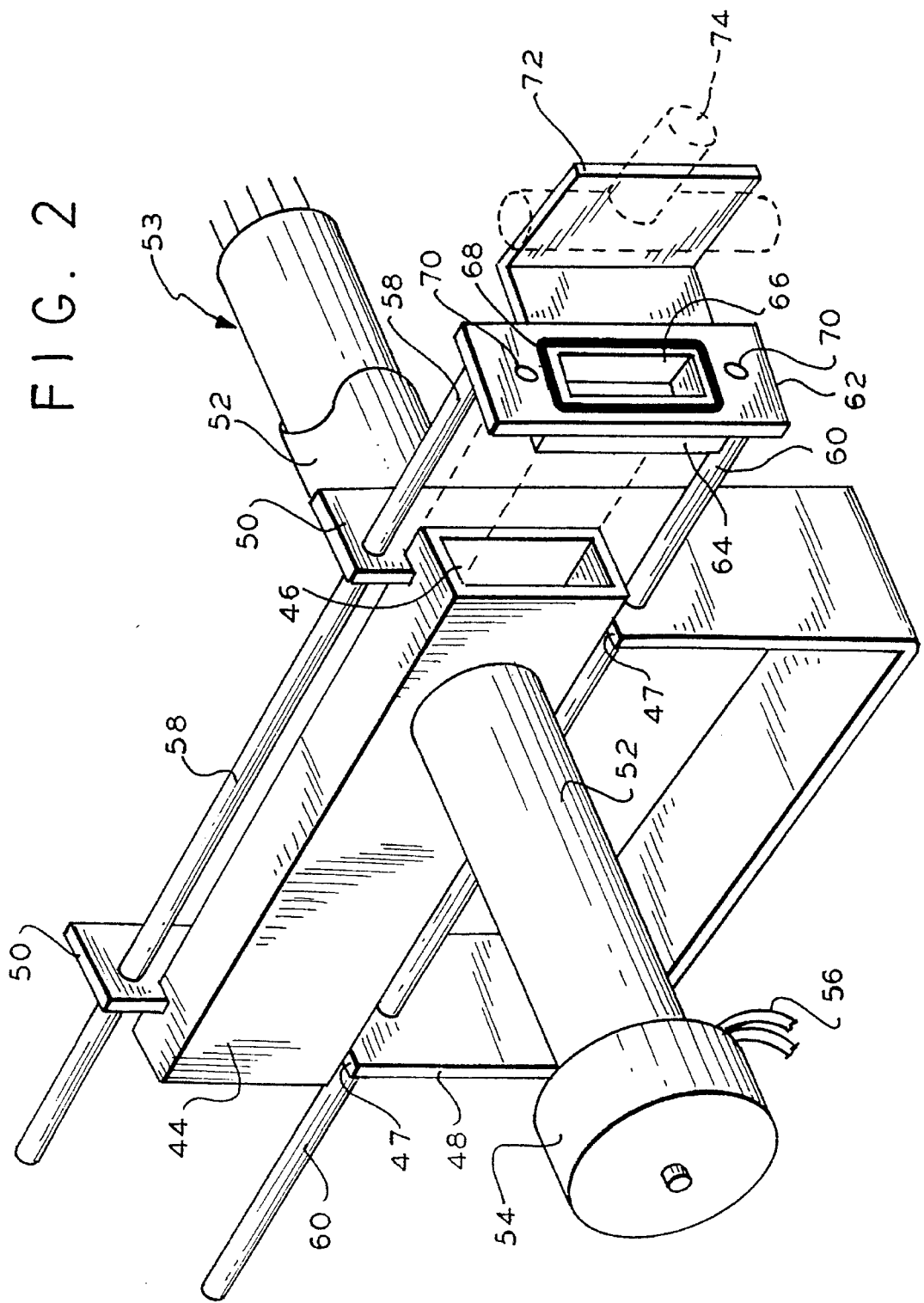
FIG. 2 is an axonometric view of a sample chamber with a sensor mounted thereto and suitable for receiving the cell body and sample and standard holder of FIG. 1.

Referring to FIG. 1, cell body 10 is shown as a rectangular block 12 made of machined steel or aluminum, although plastics, ceramics or other materials can be used instead. Fitted in a transverse circular opening 14 at the inside end of cell block 12 is a flow cell 16, shown in the form of a coil of optically transparent, 1/16 inch (1.6 mm) chromatography tubing made of Teflon™. While two turns are illustrated, in other embodiments a different number of turns may be used instead. The void volume of the cell is typically from 200 to 1000 microliters but for some applications volumes in the range of 10 to 2500 microliters are contemplated.

Tubing 16 extends in bores in cell body 12 along an inlet branch 16A and along an outlet branch 16B. Tubing branches 16A and 16B fit through corresponding apertures in front faceplate 18 to couple to inlet fitting 20 and outlet fitting 22, respectively. Faceplate 18 has a pair of countersunk bores 24 used to attach cell body 10 to structure described presently.

As explained hereinafter, a mixture of sample and a scintillating fluid can pass through tubing 16. Radioactivity in the sample can stimulate the scintillating fluid to generate photons, which can be detected by the sensor described presently. Alternatively, the tubular cell 16 can be packed with a solid material that scintillates in response to radioactivity in the sample thereby obviating the need for liquid scintillators. Among known packing materials are yttrium silicate, calcium fluoride, and scintillating glass.

A standard source is shown herein as an assembly 26 including a rectangular holder block 28 having four slots 30 containing sealed standards 32. Standards 32 may be sealed glass vials containing a scintillating solution mixed with a radioactive isotope. Thus the self-contained radioactive isotope stimulates the scintillating solution to produce a faint light, simulating the type of light produced during a normal sample test.

Four sealed standards 32 are illustrated. Each may have a different light intensity or a different scintillating fluid or isotope. Thus by selecting different ones of the standards 32, the photon flux can be varied to allow calibration of the system under various standard conditions.

The sealed standards are approximately 3 mm in diameter and 25 mm long. The sealed standards are placed into blind holes drilled into the edge of the block 28. During fabrication these blind holes have their sides milled away to produce openings for the standards. The standards are cemented in place to prevent rotation or vertical movement.

While sealed standards are illustrated, in some embodiments a different light source may used, for example, a blue photodiode powered by a constant current supply. The photodiode could either be mounted directly in a holder attached to the cell body or light could be piped in through an optical fiber. The light intensity or photon count could be adjusted by adjusting the current level through the photodiode.

Standard block 28 has a short blind bore 34 and a longer blind bore 36 sized to hold prongs 38 and 40 which project from the inside end of cell body 12. Mounted transversely and adjacent to bore 36 is a spring loaded ball 42 designed to engage the annular groove encircling the tip of prong 40. Thus prong 40 is fixed into position inside standard block 28 by ball 42.

Referring to FIG. 2, a light-tight sample chamber is shown as an elongate box 44 which is closed on five sides but open at end 46. The illustrated side walls of chamber 44 may be formed of a metal or plastic extrusion, although other materials may be used instead. Chamber 44 is shown resting atop shoulders 47 in U-shaped bracket 48. Bracket 48 is a metal strip having two vertical branches that terminate in upper projections 50, which have an inverted L-shape, sized to fit partially around the periphery of chamber 44.

Mounted on opposite sides of chamber 44 are a pair of support tubes 52, each containing a sensor in the form of a light sensitive transducer such as a photomultiplier tube. The support tubes are brazed or silver-soldered to permanently affix them in place at openings (not shown) in chamber 44. The ends of tubes 52 are covered with a cap 54. A connection to the internal photomultiplier tubes 53 is made through wire leads 56. Conventional photomultipliers are preferred although other sensors such as phototransistor arrays or other solid-state devices might be used instead. Moreover, in some embodiments radioactivity may be detected directly without employing a scintillating fluid or scintillating packing. In Cerenkov counting, light is directly generated by the passage of energetic beta particles from the sample substances through the fluid medium carrying them from the chromatography column. The standards, if of the same isotope may, but need not, contain scintillating fluid.

Cylindrical, stainless steel rods 58 and 60 are slidably mounted in apertures in the upper ends of bracket 48. Rods 58 and 60 can be fitted into nylon bearings (not shown) in bracket 48. Specifically, rod 58 is mounted in the upper end of portion 50 of bracket 48 above one of the upper corners of chamber 44. Near the diagonally opposite corner of chamber 44 rod 60 is slidably mounted in bracket 48.

Mounted to the front ends of rods 58 and 60 is a yoke plate 62. Yoke plate 62 has a rectangular opening 66 matching opening 46 in chamber 44. Yoke plate 62 is a rectangular, annular, metal slab having a rear, annular embossment 64. Opening 66 is encircled by an annular groove containing an O-ring 68, used for the light sealing purposes described presently. Also, a pair of threaded holes 70 above and below opening 66 are used for securing a sample body to yoke plate 62 as also described presently.

Attached to an edge of yoke plate 62 is an L-shaped bracket 72 used to support a plumbing tee 74, shown herein in phantom. Instead of a separate bracket 72, in some embodiments one edge of yoke plate 62 can be extended to provide a mounting surface for the plumbing tee 74. Plumbing tee 74 is herein referred to as a mixing chamber having a first and second inlet. Because tee 74 is mounted to move with the cell body attached to yoke plate 62, a rigid tube can be used from the tee outlet to the inlet of the cell.

Figure 3:
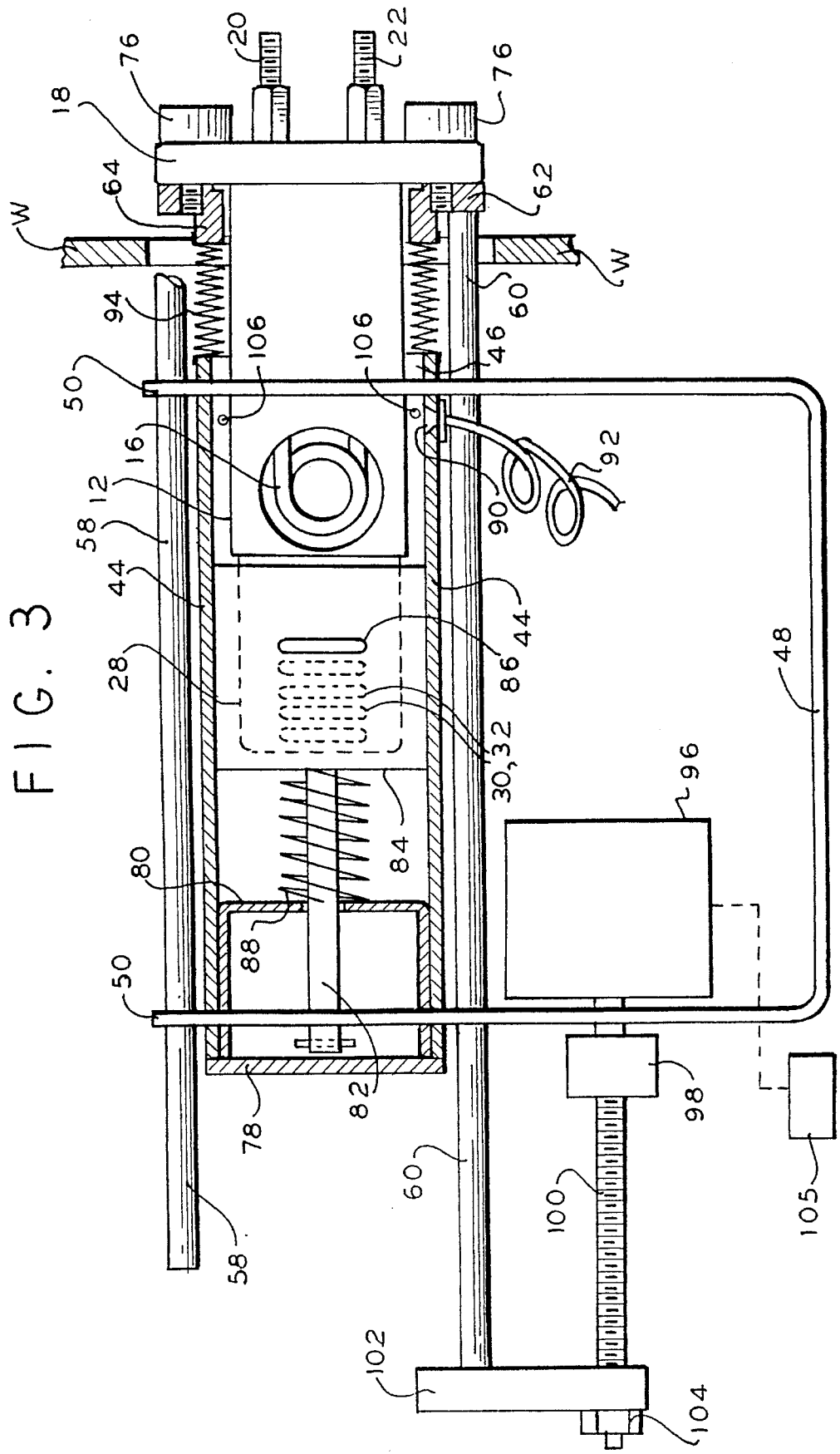
FIG. 3 is a side elevational view, partly in section, of the sample chamber of FIG. 2 with the cell body and standard holder of FIG. 1 installed.

Referring to FIG. 3, the previously mentioned faceplate 18 is shown attached to yoke plate 62 by means of thumb screws 76. Consequently, cell body 12 and standard block 28 are shown inside sample chamber 44. Sample chamber 44 is shown closed at its rear end with a cover plate 78. A U-shaped brace 80 is shown mounted inside chamber 44 adjacent to rear wall 78. A sliding rod 82 is shown mounted in a central aperture in brace 80.

The inside end of sliding rod 82 is shown connected to the back end of a shutter 84. Shutter 84 may be a rectangular, U-shaped device having on opposite sides apertures 86 sized to match the outline of the individual standard slots 30. A shutter spring is shown herein as a helical expansion spring encircling sliding rod 82 to bear between the opposing surfaces of shutter 84 and internal brace 80. Shutter 84 is thus urged to the right as illustrated in this view. In this view, shutter 84 moves to the right until it engages the inside end of standard block 28. Under these circumstances, shutter slit 86 is positioned to the right of all four standard slots 30. Thus effectively all light from standards 32 is blocked by shutter 84 in the illustrated position.

Referring to FIGS. 3 and 4, shutter stops are shown herein as a pair of horizontal rods 106 mounted across the inside of sample chamber 44, above and below cell body 12. Rods 106 are designed to limit the forward motion of shutter 84. As shown in FIG. 4, when yoke plate 62 extends outwardly, the inside end of standard holder 28 no longer restrains the shutter 84, which is then driven forwardly by spring 88 to the position shown in FIG. 4, until stopped by engaging the shutter stops 106. (Although in some embodiments the shutter may be positioned by its own separate, active drive mechanism. Also in other embodiments, the shutter may move to expose stationary sealed standards.)

Clearance at the bottom of sample chamber 44 below cell body 12 allows leakage, if any, to accumulate and flow through a drain 90. The drain 90 is shown in the floor of sample chamber 44 in the form of a hole near the opening 46 of chamber 44. Hole 90 is connected to a spirally curled, opaque tubing 92 that can be led to an appropriate capture basin (not shown). The curls in tubing 92 act as a light trap to prevent light leakage into chamber 44.

Chamber 44 is arranged to be light tight. A sleeve in the form of bellows 94 is cemented in place to encircle opening 46 of chamber 44. The forward end of bellows 94 is also cemented in place to encircle embossment 64 of yoke plate 62. As noted before, the O-ring on the front face of yoke plate 62 acts as a seal to plate 62. As thus arranged, sample chamber 44 is light tight. Light can be introduced into the chamber only by either cell 16 or sealed standards 32.

The assembly of FIGS. 3 and 4 is mounted inside a casing having a front wall W. The casing of wall W need not be light tight but will produce a darkened interior for reducing stray illumination. The opening in wall W is sized to allow free passage of bellows 94 and rods 58, 60.

A motor means is shown herein as stepper motor 96 connected through coupler 98 to lead screw 100. Lead screw 100 is threaded into drive arm 102. When threaded lead screw 100 is spun by stepper motor 96 drive arm 102 rides on lead screw 100 in the manner of a nut on a lead screw.

Secured to the outer end of threaded lead screw 100 is a stop 104, which limits the extent of travel possible by drive arm 102. Consequently, drive arm 102 can axially reciprocate slider bar 60. As a result, bar 60, yoke plate 62, and slider bar 58 can slide together as a unit.

Motor 96 is connected to a controller 105. In simplified embodiments, controller 105 can be a manual switch to increment stepper motor 96. Alternatively, controller 105 can be a computerized unit, programed to energize motor 96 in a sequence designed to accomplish the process hereinafter described.

Also in some embodiments, the cell body 12 and standard holder 28 can be repositioned manually and held in each position by mechanical detents that allow the operator to feel when the sealed standards (or cell) are in proper position. Also, while the sealed standards 32 are shown mounted in a holder 28 directly behind the cell body 12, in other embodiments they may be spaced apart. Moreover, while axial reciprocation is used to substitute the cell body with the sealed standards, in other arrangements the motion may be orbital and the cell may be replaced with the sealed standard in a carousel-like motion. Also, while the cell and sealed standards are shown mobile, in other embodiments the photomultiplier tube itself may move between the cell and the sealed standards.

FIG. 5 schematically illustrates an experimental set up. Here a high pressure chromatography column 108 has an eluate output 110 connecting to a lower input of previously mentioned mixing tee 74. The high pressure chromatograph can operate in the range of 3,000 to 5,000 psi. A source of mixing fluid is shown as a reservoir 112 of scintillating fluid feeding the upper input of mixing tee 74. Flexible Teflon™ tubing may be used to connect the two inlets of mixing tee 74. The output of mixing tee 74 is connected by stainless steel tubing to a sample line fitting 20 to feed the input of sample cell 16, whose output connects through another sample line fitting 22 to waste. Cell 16 is shown schematically shining on sensors 53. Adjacent to cell 16 are previously mentioned sealed standards 32, whose light output is regulated by shutter 84.

If the system, however, is used with solid scintillator or for Cerenkov counting, mixing tee 74 may be omitted or bypassed. In that case flexible tubing may be directly connected to the inlet 20 of cell 16.

To facilitate an understanding of the principles associated with the foregoing apparatus, its operation will now be briefly described. The eluate output 110 of high pressure chromatography column 108 feeds one input of mixing tee 74, whose other input is fed by source 112 of scintillating fluid. The output of mixing tee 74 feeds cell 16 in the usual fashion.

Different fractions of the eluate are separated by the chromatography column 108 in the usual fashion. In some instances a radioactive tracer may have been absorbed by tissues, extracts of which, after suitable treatment, are being analyzed in the chromatography column. Based on the separation characteristics of the chromatography column, the radioactive constituents reach mixing tee 74 at specific times relating to the chromatographic separation characteristics. In any event, the eluate sample is mixed with the scintillation fluid in the mixing tee 74 and delivered to cell 16.

In a known fashion, radioactivity in the sample stimulates the scintillating fluid, which then produces photons. These photons are then detected in the photomultiplier tubes 53. The counts produced by photomultiplier tubes 53 may be displayed in a table or graphically, to indicate the number of counts occurring over a period of time. In a known manner these characteristics can indicate the nature of the sample under test.

This normal test is performed with sample cell 16 oriented as shown in FIG. 3. This configuration is achieved by commanding motor 96 through controller 105 to spin threaded lead screw 100 and drive arm 102 against stop 104. This draws rod 60 and 58 backward to the maximum extent to collapse the bellows 94. Faceplate 62 is thus retracted to bring cell body 12 to the illustrated position so cell 16 is aligned with the photomultiplier tubes. At this time, the sealed standards 32 are covered by shutter 84 so that effectively no light from the sealed standards 32 will reach the photomultiplier tubes.

The entire system including the photomultiplier tubes can be calibrated by first repositioning the cell 16. Specifically, controller 105 will command stepper motor 96 to advance a predetermined number of increments. This shaft revolution will cause drive arm 102 to move to the right, thereby extending rods 60 and 58. Consequently, yoke plate 62 will extend beyond wall W, ultimately to the position illustrated in FIG. 4.

As yoke plate 62 extends, bellows 94 expands to keep light from leaking between the yoke plate 62 and the opening 46 of chamber 44. Because the inside end of standard holder 28 now no longer restrains shutter 84, shutter 84 is driven by spring 88 against the shutter stops 106. As illustrated in FIG. 4, the innermost sealed standard 32 is then aligned with shutter slit 86. Thus light from only one sealed standard illuminates the photomultiplier tubes.

The sealed standard produces a known amount of illumination. Consequently, the photomultiplier tubes can be calibrated to indicate an output in accordance with this known standard.

The controller 105 can now index stepper motor 96 a predetermined amount to bring the next sealed standard 32 in alignment with shutter slit 86. This next sealed standard, if part of a count rate linearity series, will exhibit a different count rate. Should it be part of a series employed to test instrument response to quenching or a part of a series of different isotopes, either of which constitutes an alternative use for the invention, then it will exhibit a different apparent energy distribution, i.e., more or fewer photons will be produced on average for each recorded decay event.

Once shutter 84 has been positioned between sensors 53, an alternative mode of operating controller 104 is to keep the standards moving continuously past the photomultiplier tubes, rather than stopping at discrete positions. This continuous motion is achieved by continuously pulsing stepper motor 96 over the entire travel of standard holder 28 while performing a continuous measurement of radiation. In that manner a record is obtained which simulates a chromatogram with one peak evident for each standard present.

The foregoing calibration with sealed standards tests the accuracy of the instrument itself and not the quality of the sample. The calibration test can be used periodically to determine instrument stability and to determine reproducibility from day to day. Also, as noted earlier, linearity based on count rate and changes based on the type of radioactivity or on quench effects can be ascertained. With a sealed sample containing no radioactivity being among the standard samples, this type of testing can determine the background level and whether or not it is constant.

Importantly, all the measurements with the sealed standards are performed without the need to disconnect high pressure lines from fittings 20 and 22. Furthermore, fittings 20 and 22 move only a small amount and move together with the mixing tee 74 (FIG. 2). This makes the calibration phase rather simple and avoids the possibility of leaking that could be caused by disconnecting the fittings 20 and 22 in order to replace cell body 12 with a separate sealed standard.

After the calibration is completed, the controller 105 (FIG. 4) commands the stepper motor 96 to rotate and drive arm 102 inwardly. The home position of the stepping motor can be established at the end of each standardization cycle by overdriving the motor until drive arm 102 comes against mechanical stop 104. This retracts rods 58 and 60 thereby retracting yoke plate 62. Consequently, cell body 12 retracts and the bellows 94 collapse to the position shown in FIG. 3. Thereafter, cell 16 may be used in the manner first described herein.

It is to be appreciated that various modifications may be implemented with respect to the above described preferred embodiments. For example, the light-tight sample chamber can have different shapes other than rectangular. Furthermore, instead of bellows, a light-tight telescopic fitting can be used. Also, while a yoke plate is shown mounted on sliding cylindrical rods, in other embodiments different types of moving linkages may be used instead. In addition, the sealed standards need not be behind the cell, but their relative position may be reversed. Moreover, the various mounting structures and drive mechanisms can be reconfigured depending upon the desired structural rigidity, strength, speed, temperature stability, capacity, etc.

Obviously, many modifications and variations of the present invention are possible in light of the above teachings. It is therefore to be understood that within the scope of the appended claims, the invention may be practiced otherwise than as specifically described.

We claim:

1. A continuous sample detector comprising:

a sample chamber;

a cell body having a cell and being mounted in said sample chamber for conducting a continuous sample flow;

a standard source of radiation mounted adjacent to said cell body; and a sensor mounted and arranged proximate said cell and said standard source and including moving means for allowing relative motion between said sensor and said cell and between said sensor and said standard source to cause said sensor to alternately detect radiation (a) predominantly from said cell, or (b) predominantly from said standard source of radiation.

2. A continuous sample detector according to claim 1 wherein said standard source comprises:

a plurality of standards mounted and arranged proximate said cell and said sensor to encounter relative reciprocation for allowing said sensor to alternately sense radiation of said cell and a selected one of said standards.

3. A continuous sample detector according to claim 2 wherein said cell body is slidably mounted in said sample chamber to move relative to said sensor.

4. A continuous sample detector according to claim 3 comprising:

a motor means for sliding said cell body in said sample chamber.

5. A continuous sample detector according to claim 4 comprising:

a mixing chamber mounted on said cell body to move therewith and to deliver said sample flow to said cell, said mixing chamber having a first inlet adapted to receive a sample and a second inlet adapted to receive a mixing fluid.

6. A continuous sample detector according to claim 5 comprising:

a source of scintillating fluid connected to said second inlet of said mixing chamber.

7. A continuous sample detector according to claim 4 comprising:

a shutter mounted to selectively stop light emitted from said standard source.

8. A continuous sample detector according to claim 4 comprising:

a yoke plate coupled to said motor means to be reciprocated thereby relative to said sample chamber, said yoke plate being adapted to hold said cell body in said sample chamber.

9. A continuous sample detector according to claim 8 comprising:

a mixing chamber mounted on said yoke plate to move therewith and to deliver said sample flow to said cell, said mixing chamber having a first inlet adapted to receive a sample and a second inlet adapted to receive a mixing fluid.

10. A continuous sample detector according to claim 3 wherein said cell comprises:

tubing that is optically transparent or translucent.

11. A continuous sample detector according to claim 10 wherein said tubing is wound into a coil.

12. A continuous sample detector according to claim 1 wherein said cell body is slidably mounted in said sample chamber to move relative to said sensor.

13. A continuous sample detector according to claim 12 comprising:

a chromatography column having an eluate output connected to said cell to continuously deliver said sample flow.

14. A continuous sample detector according to claim 12 comprising:

a high performance liquid chromatography column having an eluate output connected to said cell to continuously deliver said sample flow.

15. A continuous sample detector according to claim 1 wherein said standard source is attached to said cell body to move therewith relative to said sensor.

16. A continuous sample detector according to claim 1 comprising:

a shutter mounted to selectively stop light emitted from said standard source.

17. A continuous sample detector according to claim 16 wherein said standard source comprises:

a plurality of standards mounted and arranged proximate said cell and said sensor to encounter relative reciprocation for allowing said sensor to alternately sense radiation of said cell and a selected one of said standards, said shutter being slidably mounted to expose a selected one of said standards.

18. A continuous sample detector according to claim 17 wherein said shutter is slidably mounted to cover all of said standards.

19. A continuous sample detector according to claim 17 wherein said shutter is slidably mounted inside said sample chamber.

20. A continuous sample detector according to claim 19 wherein said standard source is attached to said cell body to move therewith relative to said sensor, said shutter being mounted to slide with said standard source and said cell body, said sample chamber including:

a shutter stop for stopping said shutter from moving and allowing said standard source to move relative to said shutter to expose successive ones of said standards.

21. A continuous sample detector according to claim 20 wherein said sample chamber includes:

a shutter spring for urging said shutter toward said cell body to cover all of said standards.

22. A continuous sample detector according to claim 1 wherein said sample chamber is light-tight.

23. A continuous sample detector according to claim 22 wherein said cell body is slidably mounted in said sample chamber to move relative to said sensor.

24. A continuous sample detector according to claim 23 wherein said sample chamber has an opening and said cell body is partially mounted in said opening, said detector comprising:

a bellows mounted at said opening to stretch away from said cell chamber and encircle said cell body.

25. A continuous sample detector according to claim 24 comprising:

a shutter mounted to selectively stop light emitted from said standard source.

26. A continuous sample detector according to claim 23 wherein said sample chamber comprises a drain for collecting leakage from said cell.

27. A continuous sample detector according to claim 1 wherein said sample chamber is light-tight, and wherein said sensor comprises at least one light-sensitive transducer.

28. A continuous sample detector according to claim 1 wherein said sample chamber is light-tight, and wherein said sensor comprises an opposing pair of photomultipliers.

29. A continuous sample detector according to claim 1 comprising:

a chromatography column having an eluate output connected to said cell to continuously deliver said sample flow.

30. A method employing a standard source of radiation and a sensor within a common housing for detecting radiation from a sample flow delivered along sample lines to a cell in a cell body, comprising the steps of:

connecting said sample lines to said cell body;

positioning said sensor and said cell within said common housing with a predetermined spacing to detect with said sensor radiation predominantly from said cell;

pumping said sample flow through said cell;

calibrating said sensor within said common housing by separating said sensor and said cell and disposing said sensor and said standard source within said common housing to detect with said sensor radiation predominantly from said standard source, without disconnecting said sample lines from said cell body; and repositioning said sensor and said cell within said common housing to detect with said sensor radiation predominantly from said cell.

31. A method according to claim 30 wherein said step of calibrating said sensor is performed by:

simultaneously moving said cell body and said standard source together relative to said sensor.

32. A method according to claim 31 wherein said step of calibrating employs a shutter and is performed by:

causing relative motion between said shutter and said standard to expose said standard to said sensor to allow detection of radiation from said standard source.

33. A method according to claim 31 comprising the step of:

mixing a scintillation fluid with said sample flow before delivery to said cell.

34. A method according to claim 33 wherein said step of mixing said scintillation fluid is performed at a location spatially fixed relative to said cell.

35. A method according to claim 34 wherein said step of mixing said scintillation fluid is performed by:

introducing said scintillation fluid into said sample flow for the purpose of generating light in reaction to radioactive decay.

36. A method according to claim 34 wherein the step of detecting radiation with said sensor from said cell is performed by:

directing said sample flow to circulate spirally through said cell.

37. A method according to claim 30 wherein said standard source comprises a plurality of standards, said step of repositioning being performed by:

relatively moving said standard source and said sensor to allow said sensor to alternately sense radiation of a selected one of said standards and said cell.

38. A method according to claim 37 wherein said step of calibrating is performed by:

moving successive ones of said standards adjacent said sensor to alternately sense radiation.

39. A method according to claim 30 comprising the step of:

chromatographically partitioning said sample flow before delivery to said cell.

\* \* \* \* \*